United States Patent [19]
Reese et al.

[11] 3,843,751
[45] Oct. 22, 1974

[54] LOW VISCOSTY PULVERULENT THERMOSETTING RESINOUS COMPOSITION

[75] Inventors: Johannes Reese, Wiesbaden-Biebrich; Hermann Hotze, Auringen, both of Germany

[73] Assignee: Reichhold-Albert-Chemie Aktiengesellschaft, Hamburg, Germany

[22] Filed: Dec. 8, 1972

[21] Appl. No.: 313,551

Related U.S. Application Data

[63] Continuation-in-part of Ser. No. 19,464, March 13, 1970, Pat. No. 3,723,572.

[30] Foreign Application Priority Data

Mar. 19, 1969 Germany............................ 1913923
Feb. 11, 1970 Germany...................... 2006128

[52] U.S. Cl................ 260/862, 117/93.4 R, 260/9, 260/37 R, 260/860, 260/873, 260/874
[51] Int. Cl...................... C08g 39/06, C08g 39/10
[58] Field of Search ............ 260/860, 873, 874, 862

[56] References Cited
UNITED STATES PATENTS

| | | | |
|---|---|---|---|
| 3,108,083 | 10/1963 | Laganis................................. | 260/14 |
| 3,205,192 | 9/1965 | Penson................................. | 260/40 |
| 3,277,040 | 4/1966 | Barkis................................. | 260/29.6 |
| 3,296,335 | 1/1967 | Blaschke.............................. | 260/860 |
| 3,382,295 | 5/1968 | Taylor et al. ........................ | 260/860 |
| 3,484,339 | 12/1969 | Caldwell............................... | 161/231 |
| 3,546,320 | 12/1970 | Duling................................ | 260/860 |

FOREIGN PATENTS OR APPLICATIONS

| | | |
|---|---|---|
| 203,115 | 10/1958 | Austria |
| 55,820 | 5/1967 | Germany |
| 1,164,588 | 3/1964 | Germany |

*Primary Examiner*—William H. Short
*Assistant Examiner*—T. Pertilla
*Attorney, Agent, or Firm*—Hammond & Littell

[57] ABSTRACT

A thermosetting resinous composition comprising a low viscosity pulverulent mixture of a synthetic resin component (A) containing free hydroxyl groups and a synthetic resin component (B) containing free carboxyl groups wherein one of said resin components is a copolymer (I) selected from the group consisting of IA. a copolymer containing free hydroxyl groups and based on at least one hydroxyalkylester of an unsaturated at most dicarboxylic acid of 3 to 4 carbon atoms and at least one other copolymerisable monomer, IB. a copolymer containing free carboxyl groups based on at least one olefiniccally unsaturated at most dicarboxylic acid of 3 to 5 carbon atoms and at least one other copolymerisable monomer being free from hydroxyl groups, and the other resin component (II) is selected from the group consisting of IIA. that of said copolymers not yet present, IIB. a polyester containing free hydroxyl groups and based on at least one dicarboxylic acid of 4 to 12 carbon atoms and at least one compound selected from the group consisting of an alcohol of 3 to 12 carbon atoms being at least trihydric and a combination of said at least trihydric alcohol with at least one dihydric alcohol of 2 to 18 carbon atoms, IIC. a combination of component IA with component IIB, IID. a polyester containing free carboxyl groups and based on at least one polycarboxylic acid of 4 to 24 carbon atoms and at least one dihydric alcohol of 2 to 24 carbon atoms, IIE. a combination of component IB with component IID the component IA, IIB and IIC having a hydroxyl number between 100 and 450 and a coated article having a coating based on said composition.

10 Claims, No Drawings

LOW VISCOSITY PULVERULENT THERMOSETTING RESINOUS COMPOSITION

This application is a continuation-in-part application to U.S. application Ser. No. 19464 filed Mar. 13, 1970, now U.S. Pat. No. 3,723,572.

This invention concerns improvements in synthetic resins and more particularly relates to a thermosetting pulverulent synthetic resin composition for powder coating or the manufacture of moulded articles.

Special requirements as regards their physical characteristics must be met by resins suitable for powder coating. They must e.g. have such a high melting point that after grinding they form a free-flowing powder. The powder must not agglomerate or form lumps and must therefore remain stable under normal conditions. When the powder is applied by the whirl sintering process it sinters on meeting the surface of the preheated workpiece. Both after this coating process or after spray application of the electrostatically charged powder it is fused and cured by heating. The flow properties of the fused powder must be good enough to ensure that, even in the presence of pigments, a faultless surface is produced. For powder coating purposes e.g. epoxy resin-hardener mixtures or mixtures of polyester resins with dianhydrides e.g. pyromellitic anhydride have been proposed.

Now according to the present invention there is produced a thermosetting resinous composition which comprises a low viscosity pulverulent mixture of a synthetic resin component (A) containing free hydroxyl groups and a synthetic resin component (B) containing free carboxyl groups wherein one of said resin components is a copolymer (I) selected from the group consisting of IA. a copolymer containing free hydroxyl groups and based on at least one hydroxyalkylester of an unsaturated at most dicarboxylic acid of 3 to 4 carbon atoms and at least one other copolymerisable monomer, IB. a copolymer containing free carboxyl groups based on at least one olefinically unsaturated at most dicarboxylic acid of 3 to 5 carbon atoms and at least one other copolymerisable monomer being free from hydroxyl groups, and the other resin component (II) is selected from the group consisting of IIA. that of said copolymers not yet present, IIB. a polyester containing free hydroxyl groups and based on at least one dicarboxylic acid of 4 to 12 carbon atoms and at least one compound selected from the group consisting of an alcohol of 3 to 12 carbon atoms being at least trihydric and a combination of said at least trihydric alcohol with at least one dihydric alcohol of 2 to 18 carbon atoms, IIC. a combination of component IA with component IIB, IID. a polyester containing free carboxyl groups and based on at least one polycarboxylic acid of 4 to 24 carbon atoms and at least one dihydric alcohol of 2 to 24 carbon atoms, IIE. a combination of component IB with component IID the components IA, IIB and IIC having a hydroxyl number between 100 and 450. All components are themselves solid resins which even after mixing at room temperature do not liquefy or cake. The melting point is generally above 50°C, preferably above 65°C and is advantageously not above 150°C. Both components yield free-flowing powders after grinding which even after mixing have good stability.

After the addition of pigments, the mixture of A and B can be applied, e.g. either by whirl sintering or by electrostatic spraying and the coated material may then be stoved at e.g. 150° to 300°C, preferably 180° to 250°C. Extremely tough coatings are thus formed, with a good surface and high elasticity. It is also possible to apply a plurality of such coatings to obtain certain desired effects.

Compounds A and B can be of varying chemical structure. The powder composition may e.g. be a mixture of two copolymers A and B of different constitution or a mixture of a copolymer containing free hydroxyl or carboxyl groups and a polyester containing free carboxyl or hydroxyl groups.

Component IB is generally a copolymer e.g. of mono- or dibasic olefinically unsaturated acids, such as acrylic acid, methacrylic acid, itaconic acid, maleic acid, crotonic acid, with other copolymerisable monomers e.g. styrene, ethylene, acrylates or methacrylates, acrylo- or methacrylonitrile, acryl- or methacrylamide compounds. Such copolymers containing carboxyl groups are only used for component B whilst for component IA preferably hydroxyalkyl esters of acrylic acid, methacrylic acid, crotonic acid, maleic acid, copolymerised e.g. with ethylene, styrene, acrylonitrile or the like are used.

The mixture of compounds A and B can also contain conventional additives e.g. lubricants, accelerators, organic and inorganic fillers e.g. sawdust, cellulose dust, textile cuttings, asbestos dust, ground limestone, dolomite, finely divided silicic acid, in particular quartz powder, glass powder, glass fibres, calcium-aluminium silicates or mica. In addition, pigments e.g. titanium dioxide, zinc oxide, carbon black, red or black iron oxide, cadmium yellow or chromic oxide can be added.

The pigments, fillers or other additives can be added to components A and/or B during or after their preparation. Mixing preferably takes place by grinding or melting in a kneader. Components A and B can also be mixed with various fillers.

One advantage of using two components is that each can be adjusted so as to have a very low viscosity. Thus, the viscosity of component A can be e.g. 80 – 1500, preferably 200 – 1400 cp, and that of component B e.g. 80 – 1500, preferably 150 – 1300 cp (in each case measured at 20°C in a 50% ethylene-glycol monobutylether solution). In certain cases the viscosity can be above or below the indicated ranges. The low viscosity is, however, essential for the production of coatings with a smooth surface.

A suitable mixing ratio (by weight) of components A and B is in the range 90:10 to 10:90, preferably 70:30 to 30:70. In practice, such quantities of A and B should be used that the ratio of free carboxyl groups to free hydroxyl groups is between 0.75:1 and 1:0.8, preferably between 0.9:1 and 1:0.9. Preferably the hydroxyl number of A is somewhat higher than the acid number of B.

The particle size of the powder may in general be between 30 and 200 $\mu$; for spray application particles in the range 30 to 100 $\mu$ are preferred and for whirl sintering, particles in the range up to 200 $\mu$.

The powder mixtures according to the invention may be used to form coatings having a thickness of e.g. 35 to 400, preferably 50 to 200 µ; these thicknesses ensure satisfactory edge protection. When using the electrostatic spray process coating thicknesses of e.g. 35 to 100 µ may be used and when using the whirl sintering process the thickness may be e.g. at least 100 µ. These coatings applied e.g. electrostatically or by the whirl sintering process and thermoset are in no way inferior to varnish coatings produced conventionally from solutions. In particular, good corrosion protection is obtained.

The polyesters which may be present together with the copolymers either as components IIB or IID or in admixture with the copolymers, i.e. as components IIC and IIE include polyesters of terephthalic acid, isophthalic acid, phthalic acid, adipic acid, naphthalic-1,8-dicarboxylic acid, fumaric acid, maleic acid, itaconic acid, tetrahydrophthalic acid, tetrachlorophthalic acid, hexachloro-endomethylene-tetrahydrophthalic acid or mixtures of two or more thereof.

When component A is a polyester — such as in case IIB or IIC — it may include as hydroxylic component residues of e.g. trihydric or higher functional alcohols with 3 to 12 carbon atoms, such as glycerol, trimethylolethane or -propane, hexane triols, pentaerythritol, dipentaerythritol or mixtures of two or more thereof. Mixtures of such alcohols with up to 35 molar percents of diols such as ethylene glycol, propane diols, glycol ethers such as di- and triethylene or propylene glycol or hydrogenated diphenylol propane are also suitable.

In selecting suitable components A and B it must be ensured that a melting point of at least 50°C is obtained for each component. This can e.g. be ensured by the presence in adequate amounts of residues of acids of a preponderantly aromatic character and/or trihydric or higher functional alcohols in the polyesters of IIB and IIC.

The hydroxylic polyester-component A is advantageously prepared by transesterification of a poly (ethylene terephthalate) of random molecular weight e.g. in the range usual for fibre and film manufacture, or a monomeric terephthalate ester of one or more monohydric alcohols having e.g. 1 to 4 carbon atoms, with the above-indicated trihydric or higher functional alcohols or their mixtures e.g. by heating to 180°–270°C. Suitable polyhydric alcohols for the preparation of polyester-component A also include ethers of even higher functional alcohols, such as alkyl ethers of pentaerythritol, the alkyl groups having 1–6 carbon atoms e.g. methyl, provided that these ethers have at least three free alcoholic hydroxyl groups, or alkyl esters, such as the isononyl ester of pentaerythritol.

Component A has advanageously a hydroxyl number of 100 to 450. Provided that an adequate hydroxyl number, e.g. 150 is also obtainable with dihydric alcohols, e.g. by extensive cleavage of the polyester, such alcohols can also be used alone or in combination with trihydric or higher functional alcohols. The dihydric alcohols mentioned hereinbefore and hereinafter can be used.

The high molecular weight by-products obtained from the manufacture of fibres or film can also be used for preparing polyester-component B, e.g. components IIB or IIC. When component B is a polyester it may e.g. include as hydroxylic component residues of dihydric alcohols with 2 to 24, preferably 2 to 18 carbon atoms, such as ethylene glycol, propane diols, butane diols, dimethylol cyclohexane, neopentyl glycol (2,2-dimethyl propane-1,3-diol), diethylene glycol, triethylene glycol, dihydroxy dibutylether, hydrogenated bisphenol, ethoxylated or propoxylated bisphenol or similarly modified bisphenol, partially esterified or etherified trihydric or higher functional alcohols containing in addition to the ether groups two free hydroxyl groups, such as the dimethyl ether of pentaerythritol or alkyl ethers wherein the alkyl groups have up to 6 carbon atoms or esters with ester groups having up to 10 carbon atoms of the above-indicated polyhydric alcohols or the like. The diols can also be used in admixture with higher functional alcohols e.g. those mentioned above.

The carboxylic acid component of polyester IIB or IIC may be derived from polycarboxylic acids with 2 to 24 carbon atoms or their functional derivatives such as anhydrides, esters or halides, e.g. phthalic acid, isophthalic acid, trimellitic acid, trimesic acid, pyromellitic acid, cyclopentane-dicarboxylic acid, cyclopentane-tetracarboxylic acid, cyclohexane-dicarboxylic acid, benzophenone-tetracarboxylic acid, bycyclooctene-tricarboxylic anhydride, maleic acid, fumaric acid or Diels-Alder adducts of maleic anhydride or other α,β-unsaturated dicarboxylic acids. Also suitable is e.g. the Diels-Alder adduct of maleic anhydride with colophony (24 carbon atoms). These polycarboxylic acids may be used to react with the free hydroxyl groups of the alcohols to obtain the polyester IIB or IIC. The quantity of the acid or derivative thereof employed is appropriately such that 80 % and preferably practically all free hydroxyl groups are reacted. It is also possible to use aliphatic saturated or unsaturated short-chained e.g. up to 6 carbon atoms, aliphatic polycarboxylic acids or their functional derivatives together with the acid components mentioned hereinbefore, in a proportion not exceeding 20 % by weight of total acid components. Suitable aliphatic acids are e.g. succinic acid, adipic acid, maleic acid, fumaric acid or the like. Appropriately the acid number is 150 to 350. By using longer-chained dihydric alcohols, e.g. those with 8 to 24 or 12 to 24 carbon atoms or dihydric alcohols with 2 to 18 carbon atoms containing ether groups, such as di-, tri-, tetra- or pentaethyleneglycol, the elasticity of the composition can be regulated. Optionally transesterification can be accelerated by the addition of catalysts e.g. zinc chloride or cobalt salts e.g. cobaltous salts of half-esters of divalent acids.

In order that the invention may be better understood the following examples are given by way of illustration only. Resins IIB and IID illustrate the preparation of resins suitable as components IIB and IID, while the examples illustrate the preparation and use of compositions according to the invention.

Resins IIB

IIB1. 3000 g of poly(ethylene terephthalate) and 2010 g of trimethylol propane are heated to 250°C, while introducing an inert protective gas. The ethylene glycol liberated during transesterification is collected in a receiver. After about 3½ hours the amount of distillate is 350 g. Subsequently the reaction mixture is cooled to 160°C and water pump vacuum applied. The temperature is again raised to 230°C and held there until 500 g of distillate have distilled off. Then the resin is drawn off.

The OH number of the resin is 260 and the melting range 70°–77°C.

IIB2. 3000 g of poly(ethylene terephthalate) and 1380 g of glycerol are heated to 250°C. After 3½ hours water pump vacuum is applied and the temperature lowered to 230°C. After a further hour in vacuo the resin is drawn off. The resin has the following characteristics: hydroxyl number 300, melting range 68°–73°C.

IIB3. 1200 g of trimethylolethane and 200 g of poly(ethylene terephthalate) are heated to 250°C. After 4 hours 250 g of distillate have distilled over. Subsequently water pump vacuum is applied and the temperature lowered to 230°C. After 30 minutes the resin is drawn off. characteristics of the product: OH number 280, melting range 66°–74°C.

IIB4. 240 g of hydrogenated diphenylolpropane are esterified with 296 g of phthalic anhydride to an acid number of 40. Subsequently 268 g of trimethylolpropane are added, followed by further esterification to an acid number of 20. After cooling, the resin has a melting point of 75°C and a hydroxyl number of 270.

IIB5. 240 g of hydrogenated diphenylolpropane are esterified with 296 g of phthalic anhydride to an acid number of 40. subsequently 272 g of pentaerythritol are added and esterification to an acid number of 40 takes place. After cooling, the resin has a melting point of 80°C and a hydroxyl number of 300.

IIB6. 360 g of trimethylol propane are esterified with 444 g of phthalic anhydride to an acid number of 60. The resin thus obtained has a hydroxyl number of 250 and a melting point of 60°C.

IIB7. 344 g of propoxylated diphenylolpropane are heated for 20 minutes to 150°C with 196 g of maleic anhydride. Subsequently the reaction mixture is mixed with 272 g of pentaerythritol, followed by esterification at 190°C to an acid number of 20. A resin with a hydroxyl number of 300 is obtained.

Resins IID

IID1. In the same apparatus as used for the preparation of component IIB 2000 g of poly(ethylene terephthalate) and 1060 g diethylene glycol are heated to 250°C in the presence of 5 g of cobalt butyl phthalate. When 350 g of distillate have distilled over, the reaction mixture is allowed to cool to 170°C and mixed with 1920 g of trimellitic anhydride. The temperature is now held at 160°C for 30 minutes. Subsequently the resin is drawn off. Characteristics of the product: acid number 200, melting range 65°–75°C.

IID2. 2000 g of poly(ethylene terephthalate) and 1440 g of dimethylol cyclohexane are heated to 250°C in the presence of 5 g of cobalt butyl phthalate. After 2 hours 250 g have distilled over. After cooling to 200°C, 1920 g of trimellitic anhydride are added. The reaction mixture is heated to 280°C and this temperature is held for 15 minutes. The resin is then drawn off.

The resin has the following characteristics: acid number 107, melting range 89°–96°C.

IID3. 2000 g of poly(ethylene terephthalate) and 1040 g of 2,2-dimethyl propane-1,3-diol are heated to 250°C in the presence of 5 g of cobalt butyl phthalate. After 2 hours, 250 g of distillate have distilled over. After cooling to 200°C, 1920 g of trimellitic anhydride are added. The reaction mixture is brought to 180°C and held at this temperature for 30 minutes. Subsequently the resin is drawn off. The acid number amounts to 208 and the melting range is 86°–94°C.

IID4. 2000 g of poly(ethylene terephthalate), 1200 g of hydrogenated bisphenol and 1500 g of a polymerised ethylene glycol with a molecular weight of about 300 are heated to 250°C in the presence of 5 g of cobalt butyl phthalate. After 2 hours, 11 g of distillate have distilled over. After cooling to 200°C, 1920 g of trimellitic acid are added. After 30 minutes at 180°C the resin is drawn off. characteristics of the product: acid number 150, melting range 54°–60°C.

IID5. 400 g of poly(ethylene terephthalate) and 268 g of trimethylolpropane are heated to 250°C for 2 hours. In this period 60 g of distillate distils over. After cooling to 200°C, 592 g of phthalic anhydride are added thereto. The temperature is held at 200°C for one-half hour. Subsequently the resin is drawn off. It has the following characteristics: acid number 160, melting range 69°–78°C.

IID6. 400 g of poly(ethylene terephthalate) and 268 g of 1,2,6-hexanetriol are held at 250°C for 2 hours. After this time 75 g of distillate have distilled over. After cooling to 200°C, 592 g of phthalic anhydride are added thereto. After 30 minutes at 200°C the resin is drawn off. The characteristics are as follows: acid number 133, melting range 48°–52°C.

IID7. 296 g of phthalic anhydride are esterified to an acid number of 30 with 150 g of ethylene glycol. Subsequently 192 g of trimellitic anhydride are added and the mixture is held for 30 minutes at 170°C. After cooling, the resin has the following characteristics: acid number 209, melting point 61°C.

IID8. 219 g of adipic acid are esterified to an acid number of 20 with 360 g of hydrogenated diphenylolpropane and 32 g of diethyleneglycol. Subsequently 144 g of trimellitic anhydride are added. The mixture is held for 30 minutes at 170°C and allowed to cool. Characteristics: acid number 146, melting point 72°C.

IID9. 296 g of phthalic anhydride are esterified to an acid number of 40 with 240 of hydrogenated diphenylolpropane and 148 g of diethylene glycol. Subsequently 192 g of trimellitic anhydride are added and the temperature held at 170°C for 30 minutes. A resin is obtained with a melting point of 73°C and an acid number of 167.

IID10. 219 g of adipic acid are esterified to an acid number of 15 with 360 g of hydrogenated diphenylolpropane and 41 g of dimethylolpropane. Subsequently 288 g of trimellitic anhydride are added and the mixture is held for 30 minutes at 170°C. A resin is obtained with a melting point of 72°C and an acid number of 217.

IID11. 600 g of a high molelcular weight poly(ethylene terephthalate) polyester are degraded with 228 g of 1,2-propanediol for 2 hours at 250°C. Subsequently the reaction mixture is mixed with 666 g of bicyclooctenetricarboxylic anhydride and the reaction mixture is held for 2 hours at 180° to 190°C. A resin with a melting point of 75°C and an acid number of 150 is obtained.

IID12. 400 g of a high molecular weight poly(ethylene terephthalate) polyester are degraded with 268 g of trimethylolpropane at 250°C for 2 hours. Subsequently 592 g of phthalic anhydride are added and the reaction mixture is held for 15 minutes at 200°C. The resin has a melting point of 75°C and an acid number of 163.

Examples — Thermosetting compositions 1. 50 g of a copolymer of melting point 90°C (component IA), formed from 70 parts by weight of methyl methacrylate and 30 parts by weight of β-hydroxypropylmethacrylate, and 50 g of a copolymer (of melting point 100°C, component IB), formed from 70 parts by weight of methyl methacrylate and 30 parts by weight of methacrylic acid, are homogenised in an extruder.

2. 50 g of component IB of the previous example are homogenised in a kneader with 50 g of component IIB1 and 50 g of titanium dioxide.

3. 50 g of component IA of Example 1 and 50 g of component IID4 are homogenised in a kneader with 50 g of titanium dioxide.

4. In the same way as in Example 1 the component IA or IB can be mixed with a pigment. Also various pigments can be mixed in. After stoving for 15 to 20 minutes film coatings of similar good quality are always obtained.

5. 50 g of a copolymer of melting point 90°C (component IA), from 70 % by weight of methylmethacrylate and 30 % by weight of β-hydroxypropyl methacrylate and 40 g of component IID1 are homogenized together with 40 g of titanium dioxide in a kneader. Subsequently the mixture is pulverized to form a powdered mixture.

6. 25 g of component IA from example 5 and 25 g of component IIB1 are homogenized together with 50 g of component IID1 in the presence of 50 g of titanium dioxide in a kneader.

7. 50 g of component IIB1, 25 g of component IB from example 1 and 25 g of component IID1 are homogenized in a kneader in the presence of 50 g titanium dioxide.

8. 40 g of component IIB1, 10 g of a copolymer prepared from 40 parts of methyl methacrylate, 30 parts of β-hydroxyproply acrylate and 30 parts of styrene, 40 g of component IID1, 10 g of a copolymer prepared from 50 parts of ethyl acrylate, 40 parts of crotonic acid and 10 parts of acrylnitrile are homogenized in a kneader in the presence of 50 g titanium dioxide.

The mixtures of examples 1 to 8, if not already in powder form, are pulverised to form powdered mixtures which are suitable as coating powders.

What we claiim is:

1. A thermosetting resinous composition comprising a low viscosity pulverulent mixture of a synthetic resin component A containing free hydroxyl groups and a synthetic resin component B containing free carboxyl groups wherein one of said resin components is a copolymer I selected from the group consisting of
   IA. a copolymer containing free hydroxyl groups and based on at least one hydroxyalkylester of an unsaturated at most dicarboxylic acid of 3 to 4 carbon atoms and at least one other copolymerisable monomer selected from the group consisting of styrene, ethylene and esters, nitriles and amides of acrylic acid and methacrylic acid,
   IB. a copolymer containing free carboxyl groups based on at least one olefinically unsaturated at most dicarboxylic acid of 3 to 5 carbon atoms and at least one other copolymerisable monomer being free from hydroxyl groups selected from the group consisting of styrene, ethylene and esters, nitriles and amides of acrylic acid and methacrylic acid,
and the other resin component II is selected from the group consisting of
   IIA. that of said copolymers not yet present,
   IIB. a polyester containing free hydroxyl groups and based on at least one dicarboxylic acid of 4 to 12 carbon atoms and at least one compound selected from the group consisting of an alcohol of 3 to 12 carbon atoms being at least trihydric and a combination of said at least trihydric alcohol with at least one dihydric alcohol of 2 to 18 carbon atoms,
   IIC. a combination of component IA with component IIB,
   IID. a polyester containing free carboxyl groups and based on at least one polycarboxylic acid of 4 to 24 carbon atoms and at least one dihydric alcohol of 2 to 24 carbon atoms,
   IIE. a combination of component IB with component IID the component IA, IIB and IIC having a hydroxyl number between 100 and 450.

2. A composition as claimed in claim 1, wherein the melting points of the components A and B are at least 65 and not higher than 150°C.

3. A composition as claimed in claim 1, wherein the hydroxyl number of component A is higher than the acid number of component B.

4. A composition as claimed in claim 1, wherein the components A and B are present in such an amount that the ratio of the free carboxyl groups to the free hydroxyl groups is in the range from 0.75:1 to 1:0.8.

5. A composition as claimed in claim 1, wherein the viscosity of component A is 200 to 1400 cP and that of component B is 150 to 1300 cP (measured at 20°C in a 50 % ethylene glycol monobutylether solution).

6. A composition as claimed in claim 1, wherein component IA is a copolymer based on a hydroxyalkylester of an acid selected from the group consisting of acrylic acid, methacrylic acid, crotonic acid and maleic acid.

7. A composition as claimed in claim 1, wherein component IB is a copolymer based on an acid selected from the group consisting of acrylic acid, methacrylic acid, crotonic acid and maleic acid.

8. A composition as claimed in claim 1, wherein component IA is a copolymer based on 70 % by weight of methyl methacrylate and 30 % by weight of β-hydroxypropyl methacrylate.

9. A composition as claimed in claim 1, wherein component IB is a copolymer based on 70 % by weight of methyl methacrylate and 30 % by weight of methacrylic acid.

10. A composition as claimed in claim 1, wherein component IIB is a transesterification product of a high-molecular weight terephthalic acid polyester or a monomeric terephthalic acid ester of a monohydric alcohol having 1 to 4 carbon atoms with at least one alcohol selected from the group consisting of at least trihydric alcohols having 3 to 12 carbon atoms and dihydric alcohols having 2 to 18 carbon atoms.

* * * * *